(12) United States Patent
Shimada

(10) Patent No.: US 7,597,643 B2
(45) Date of Patent: Oct. 6, 2009

(54) GEAR DEVICE

(75) Inventor: Toshiaki Shimada, Hiroshima (JP)

(73) Assignee: Im Corporation, Hiroshima (JP)

( * ) Notice: Subject to any disclaimer, the term of this patent is extended or adjusted under 35 U.S.C. 154(b) by 400 days.

(21) Appl. No.: 11/575,126

(22) PCT Filed: Jun. 30, 2006

(86) PCT No.: PCT/JP2006/313097

§ 371 (c)(1),
(2), (4) Date: Mar. 12, 2007

(87) PCT Pub. No.: WO2008/001460

PCT Pub. Date: Jan. 3, 2008

(65) Prior Publication Data

US 2009/0054192 A1  Feb. 26, 2009

(51) Int. Cl.
*F16H 1/32* (2006.01)
(52) U.S. Cl. .................................... 475/178
(58) Field of Classification Search ............. 74/52, 74/89.34, 89.16
See application file for complete search history.

(56) References Cited

U.S. PATENT DOCUMENTS

| 5,655,985 A | * | 8/1997 | Herstek | 475/179 |
| 6,517,460 B2 | * | 2/2003 | Takeuchi et al. | 475/162 |
| 6,656,076 B2 | * | 12/2003 | Strowik et al. | 475/178 |
| 2008/0282840 A1 | * | 11/2008 | Shimada | 74/841 |

FOREIGN PATENT DOCUMENTS

| JP | 49-76164 | 7/1974 |
| JP | 53-115454 | 10/1978 |
| JP | 2-45554 | 12/1990 |
| JP | 7-4950 U | 1/1995 |
| JP | 2002-156011 A | 5/2002 |

* cited by examiner

*Primary Examiner*—Dirk Wright
(74) *Attorney, Agent, or Firm*—Roberts Mlotkowski Safran & Cole, P.C.; Thomas W. Cole

(57) ABSTRACT

First input-side eccentric part 39a of an input shaft 39 is inserted into a central hole of an external gear 47. A crank pin 60 for controlling the motion of the external gear 47 has a first crank-side eccentric part 60d whose eccentricity is equal to that of the first input-side eccentric part 39a. The first crank-side eccentric part 60d is engaged with the external gear 47. The input shaft 39 has a second input-side eccentric part 39b whose eccentricity is larger than that of the first input-side eccentric part 39a. The second input-side eccentric part 39b is provided with a driving member 49 such that the driving member 49 is rotatable. The crank pin 60 has a second crank-side eccentric part 60c whose eccentricity is equal to that of the rear eccentric part 39b. The second crank-side eccentric part 60c is engaged with the driving plate 67.

4 Claims, 10 Drawing Sheets

GEAR DEVICE

TECHNICAL FIELD

The present invention relates to a gear device configured such that the external gear in eccentrically-orbital motion is meshed with the internal gear.

BACKGROUND ART

Conventionally, as disclosed in, for example, Patent Document 1, a so-called eccentrically-orbital gear device has been known, which includes an annular internal gear having internal teeth formed in the inner perimeter surface and an external gear provided inside the internal gear to produce eccentrically-orbital motion while being meshed with the internal gear, the external gear having external teeth which are smaller in number than the internal teeth. The input shaft of this gear device is rotatably supported by the main part of the device through a bearing. The input shaft is provided with an input-side eccentric part, which is inserted in a central hole formed in the central part of the external gear through a bearing such that it is rotatable around its center line. The main part of the device is provided with two crankshafts rotatably supported thereby. Each crankshaft is provided with a crank-side eccentric part which has the same eccentricity as that of the input-side eccentric part. This crank-side eccentric part is rotatably inserted in an insertion hole formed in the external gear at a radially outer position such that both of the crankshafts are engaged with the external gear.

In the gear device having such a configuration, rotation of the input shaft by a motor, or the like, drives the external gear due to the motion of the input-side eccentric part, so that the external gear causes the crankshafts to rotate around their center lines. Since the crankshafts are supported by the main part of the device and the crank-side eccentric parts are engaged with the external gear, the motion of the external gear is controlled by the crankshafts such that the external gear orbits while being inhibited from rotating and being meshed with the internal gear eccentrically from the center of the input shaft by the eccentricity of the input-side eccentric part. This eccentrically-orbital motion of the external gear decreases the rotation speed of the input shaft.

[Patent Document 1] Japanese Utility Model Publication for Opposition No. 2-45554

DISCLOSURE OF INVENTION

Problems to be Solved by the Invention

In the gear device of Patent Document 1, for the purpose of downsizing the device, or according to the setting of the number of teeth or size of each gear, the eccentricity of the input-side eccentric part can be set to a small value, for example, 3 mm or less. In this case, the eccentricity of the crank-side eccentric part which should be equal to the eccentricity of the input-side eccentric part has a small value. However, the crankshafts are allowed to have a predetermined tolerance in production, and the main part of the device and the bearings which support the crankshafts are also allowed to have tolerances. Thus, when the crankshafts are combined with the main part of the device, a backlash can occur between the main part of the device and the crankshafts though it would be small. Likewise, the tolerances can produce a small backlash in engagement sections between the crankshafts and the external gear. With such backlashes in respective sections, if the eccentricity of the crank-side eccentric part is small as described above, the backlash size is large relative to the eccentricity, so that the backlashes affect the operation of the crankshafts. For example, when the input shaft in a state of repose starts to rotate, force in the rotation direction is not transmitted from the external gear to the crankshafts, so that there is a possibility that the crankshafts do not normally rotate. Especially in the case of a device having two crankshafts as in Patent Document 1, there is a possibility that the motions of the crankshafts get out of synchronization. In such a case, the motion of the external gear is not accurately controlled by the crankshafts, so that the operation of the gear device lacks smoothness. To avoid this, the processing accuracy for the crankshafts, the main part of the device, and the external gear can be increased to provide narrower tolerance ranges. The higher processing accuracy, however, increases the production cost of each part and hence greatly increases the price of the gear device.

The present invention was conceived in view of the above circumstances. An objective of the present invention is to provide an eccentrically-orbital gear device having an internal gear and an external gear meshed with the internal gear while being in eccentrically-orbital motion, wherein smooth operation of the gear device is realized without increasing the processing accuracy of each part, whereby great increase in price of the gear device is avoided.

Means for Solving the Problems

To achieve the above objective, according to the present invention, the input shaft is provided with an eccentric part which has a larger eccentricity than that of the orbiting external gear. This eccentric part is utilized to rotate the crankshaft.

Specifically, the first invention is directed to an eccentrically-orbital gear device including: an internal gear; an external gear placed inside the internal gear; an input shaft having a first input-side eccentric part which is inserted in a central hole formed in the external gear such that the first input-side eccentric part is rotatable around its center line; and a crankshaft rotatably supported by a device main body, the crankshaft having a first crank-side eccentric part which is engageable with the external gear with an eccentricity equal to that of the first input-side eccentric part, the external gear produces eccentrically-orbital motion while being meshed with the internal gear and being inhibited by the crankshaft from rotating, wherein the input shaft has a second input-side eccentric part whose eccentricity is larger than that of the first input-side eccentric part, the second input-side eccentric part is provided with a driving member for driving the crankshaft such that the driving member is rotatable around a center line of the second input-side eccentric part, and the crankshaft has a second crank-side eccentric part which has an eccentricity equal to that of the second input-side eccentric part and which is engageable with the driving member.

With this structure, when the input shaft rotates to move the first input-side eccentric part, the external gear, with which the first crank-side eccentric part of the crankshaft is engaged, produces eccentrically-orbital motion while being meshed with the internal gear and being inhibited from rotating. The rotation of the input shaft also moves the second input-side eccentric part, and accordingly, the driving member, with which the second crank-side eccentric part is engaged, starts eccentrically orbiting with an eccentricity larger than that of the external gear while being inhibited from rotating. Since the eccentricity of the orbiting driving member is larger than that of the external gear, the effects of backlashes caused in the crankshafts, etc., within their tolerances are small relative to the motion of the driving member. This eccentrically-orbital motion of the driving member exerts force on the second crank-side eccentric part, so that the crankshafts can normally rotate around their center line. As a result, the motion of the external gear can be accurately controlled by the crankshafts.

The second invention is directed to the first invention, wherein the crankshaft includes a plurality of crankshafts.

With this structure, the motion of multiple parts of the external gear can be accurately controlled by the crankshafts.

The third invention is directed to the second invention, wherein the plurality of crankshafts are driven by a single driving member.

With this structure, the plurality of crankshafts can be rotated in the same fashion.

The fourth invention is directed to the second invention, wherein a linking member is provided for linking the plurality of crankshafts.

This structure enables the plurality of crankshafts to cooperate.

EFFECTS OF THE INVENTION

According to the first invention, the crankshafts are rotated by the driving member which orbits with a larger eccentricity than that of the orbiting external gear. Thus, the motion of the external gear can be accurately controlled such that smooth operation of the gear device is realized without increasing the processing accuracy of respective parts and hence without narrowing the tolerances. Therefore, great increase in price of the gear device can be avoided.

According to the second invention, a plurality of crankshafts are provided. The motions of multiple parts of the external gear can be accurately controlled, such that smooth operation of the gear device is realized.

According to the third invention, the plurality of crankshafts can be rotated by a single driving member in the same fashion. Therefore, the motion of the external gear can be controlled more accurately.

According to the fourth invention, the plurality of crankshafts cooperate so that the motion of the external gear can be controlled more accurately.

DESCRIPTION OF REFERENCE NUMERALS

Figure 1:
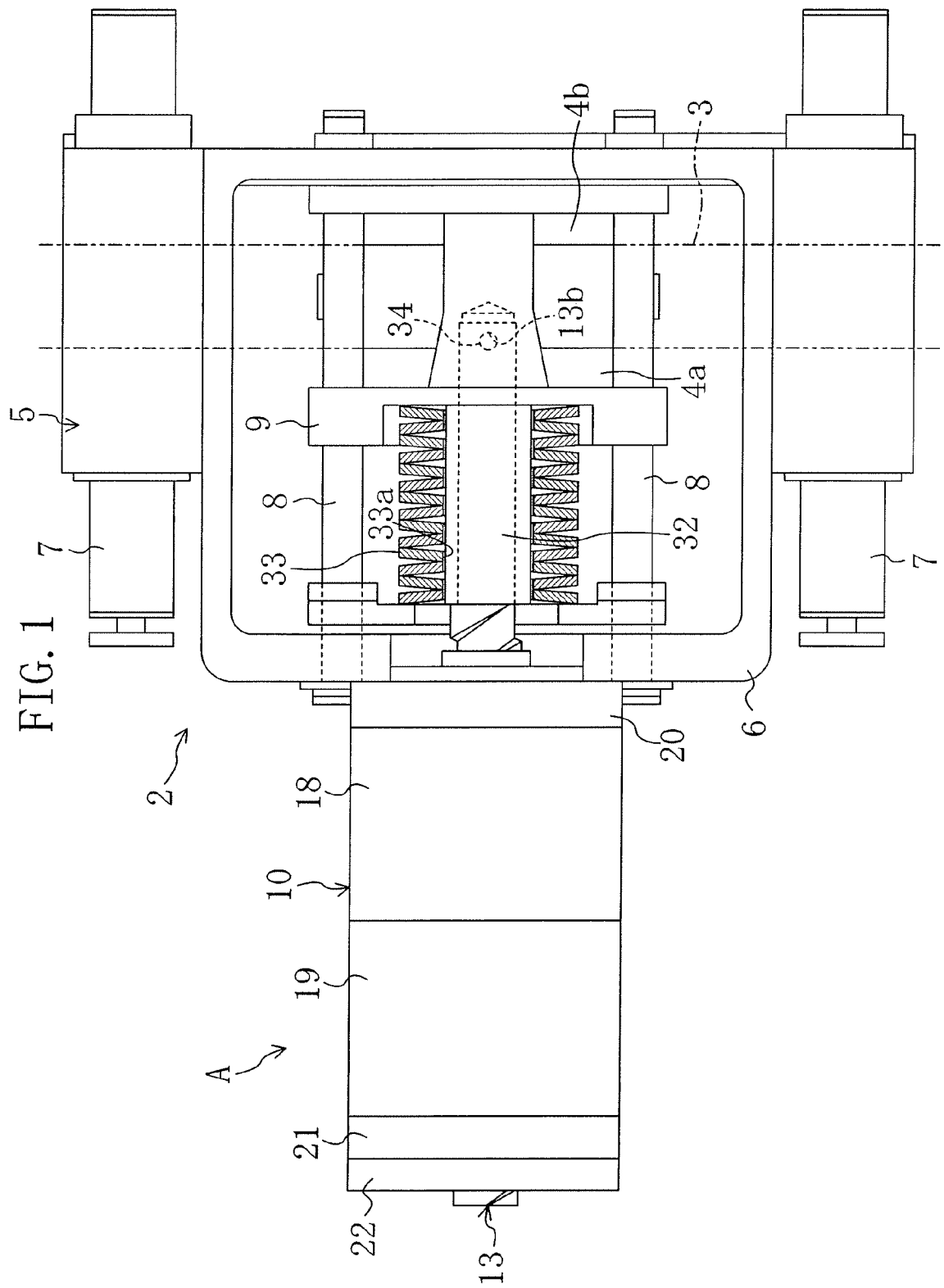
FIG. 1 is a side view of a brake driving device and braking mechanism, partially showing a cross section.

1 Gear device
2 Braking mechanism
10 Casing (Device main body)
11 Electric motor
39 Input shaft
39a Front eccentric part (First input-side eccentric part)
39b Rear eccentric part (Second input-side eccentric part)
45 Internal gear
47 External gear
60 Crank pin (Crankshaft)
60c Small diameter part (Second crank-side eccentric part)
60d Engagement part (First crank-side eccentric part)
66 Linking member
67 Driving plate (Driving member)
A Brake driving device

BEST MODE FOR CARRYING OUT THE INVENTION

Hereinafter, embodiments of the present invention will be described in detail with reference to the drawings. It should be noted that the following descriptions of the preferred embodiments are essentially exemplary and do not intend to limit the present invention or applications and uses thereof.

FIG. 1 shows a brake driving device A including a gear device 1 according to an embodiment of the present invention and a braking mechanism 2 to which the brake driving device A is attached. In the descriptions of this embodiment, the structure of the braking mechanism 2 is described before the description of the brake driving device A is given.

The braking mechanism 2 is supposed to be installed in a car of the electric train (not shown) and is configured such that brake pads 4a and 4b are pressed against both surfaces of a brake disc 3 which is a rotation element rotatable integrally with a wheel (not shown) to produce braking force. The braking mechanism 2 includes a caliper main element 5. The caliper main element 5 has a frame 6. The frame 6 is supported by a pair of slide pins 7 extending in the rotation axis direction of the brake disc 3 at an unrotatable portion of the lower part of the train car in the vicinity of the brake disc 3. Namely, the frame 6 is floatingly supported such that it is movable in the rotation axis directions with respect to the unrotatable portion of the train car.

Inside the frame 6, a pair of brake pads 4a and 4b are provided to sandwich the brake disc 3 in the thickness direction. A pair of poles 8 extending in the moving direction of the brake pads 4a and 4b are provided inside the frame 6 such that both ends of the poles 8 are fixed to the frame 6. Further, a press member 9 is also provided inside the frame 6. The press member 9 is supported such that it is slidable in the center line directions of the poles 8 with respect to the poles 8. When the brake pad 4a, which is provided on the press member 9 side, is pressed against the brake disc 3 by the press member 9, the reaction force causes the frame 6 to slide along the slide pins 7, so that the other brake pad 4b is pressed against the other surface of the brake disc 3 opposite to the brake pad 4a.

Figure 2:
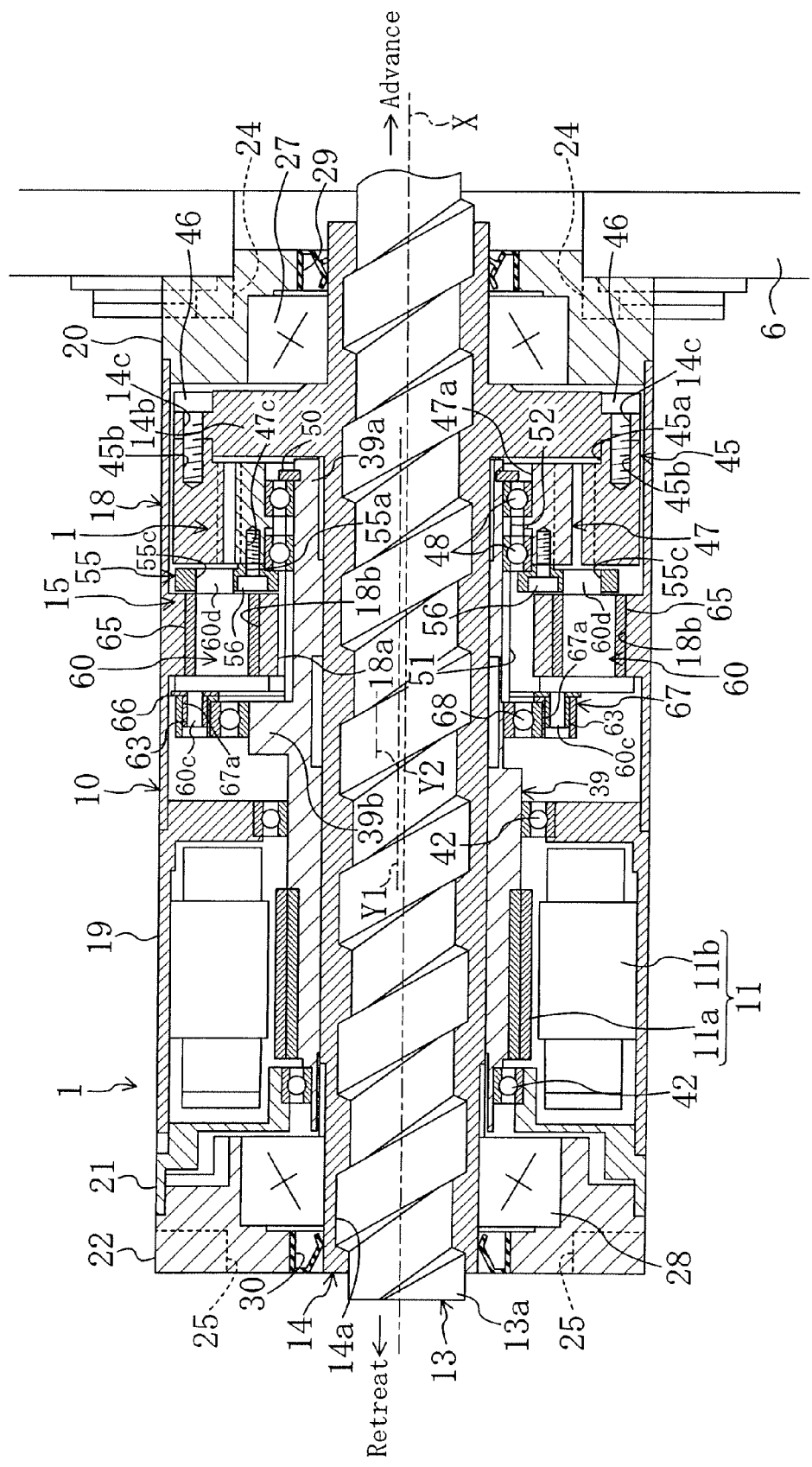
FIG. 2 is a cross-sectional view of the brake driving device including a gear device according to an embodiment of the present invention.

The brake driving device A includes a cylindrical casing 10 extending in the moving direction of the brake pads 4a and 4b. The cylindrical casing 10 accommodates, as shown in FIG. 2, an electric motor 11, the gear device 1, a travel screw member 13, and a nut member 14. The nut member 14 is to be rotated by the torque output by the gear device 1 while being meshed with the travel screw member 13. In the casing 10, the gear device 1 is accommodated on the advance side of the travel screw member 13, i.e., the caliper main element 5 side. The electric motor 11 is accommodated in the casing 10 on the retreat side of the travel screw member 13, i.e., the opposite side to the caliper main element 5. It should be noted that, in the descriptions of this embodiment, the advance side of the travel screw member 13 is simply referred to as "front", and the retreat side is simply referred to as "rear".

The casing 10 has a rectangular cross section and consists of two components, a front casing component 18 for accommodating the gear device 1 and a rear casing component 19 for accommodating the electric motor 11. The external dimension of the casing 10 is about 100 mm.

A front lid member 20 having the shape of a rectangular plate is attached to the front end of the front casing component 18 as shown in FIG. 1 and FIG. 2. A rectangular supporting plate 21 is attached to the rear end of the rear casing component 19. A rear lid member 22 is attached to the rear surface of the supporting plate 21. The front part of the casing 10 is fixed to the caliper main element 5.

The front lid member 20, the front casing component 18 and the rear casing component 19 are fastened to each other in the axial direction with bolts 24 at the four corners. Also, the rear lid member 22, the supporting plate 21 and the rear casing component 19 are fastened to each other in the axial direction with bolts 25 in the same fashion. As a result, the front lid member 20, the front casing component 18, the rear casing component 19, the supporting plate 21 and the rear lid member 22 constitute an integral unit.

The nut member 14 is provided such that its center line is coincident with the center line of the casing 10. As shown in FIG. 2, the front end portion of the nut member 14 is supported by the front lid member 20 through a nut front bearing 27, and the rear end portion of the nut member 14 is supported by the rear lid member 22 through a nut rear bearing 28. These bearings 27 and 28 are formed by tapered roller bearings. The inner perimeter surface of the nut member 14 has a thread 14a extending from the front end to the rear end.

The length of the nut member 14 is longer than the axial length of the casing 10, the front end of the nut member 14 protrudes out of the front lid member 20. The front end of the nut member 14 is provided with a front oil seal 29 for sealing a gap between the outer perimeter surface of the nut member 14 and the front lid member 20, and the rear end is likewise provided with a rear oil seal 30. The nut member 14 has an extended part 14b behind the nut front bearing 27. The extended part 14b has the shape of a circular disc radially extending about the nut member 14. The perimeter of the extended part 14b is provided with a plurality of bolt insertion holes 14c along the perimeter with intervals therebetween. Each of the bolt insertion holes 14c penetrates through the extended part 14b in the center line direction. The bolt insertion holes 14c are designed such that bolts 46 penetrate through the bolt insertion holes 14c to fasten an internal gear 45 (described later).

The travel screw member 13 is provided such that its center line is coincident with the center line of the casing 10. The travel screw member 13 is supported by the casing 10 through the nut member 14 while being meshed with the nut member 14. The length of the travel screw member 13 is greater than the length of the nut member 14. As also shown in FIG. 1, about a frontal ⅓ of the travel screw member 13 meshed with the nut member 14 protrudes forward out of the front end of the nut member 14. The rear end of the travel screw member 13 also slightly protrudes out of the rear end of the nut member 14. The outer perimeter surface of the travel screw member 13 has a thread 13a in about a frontal ⅓ region, which is meshed with the thread 14a of the nut member 14. The travel screw member 13 is a trapezoidal thread shaft.

As shown in FIG. 1, the part of the travel screw member 13 protruding beyond the nut member 14 is fittingly covered with a cylindrical spacer 32. The outer perimeter side of the spacer 32 is provided with a belleville spring 33 which urges the press member 9 toward the brake disc 3. The belleville spring 33 consists of a large number of stacked disks and is attached to the travel screw member 13 with the spacer 32 inserted through the center hole 33a. The belleville spring 33, which is attached to the travel screw member 13, abuts on the press member 9 and on an inner surface of the frame 6 at the brake driving device A side. The urging force of the belleville spring 33 presses the brake pads 4a and 4b against the brake disc 3. The force of pressing the brake pads 4a and 4b is set so as to produce sufficient braking force for stopping the train car.

The front end of the travel screw member 13 has a pin insertion hole 13b which penetrates through the travel screw member 13 in a radial direction. The press member 9 has a pin insertion hole (not shown) corresponding to the pin insertion hole 13b. Through the pin insertion hole 13b of the travel screw member 13 and the pin insertion hole of the press member 9, a taper pin 34 is to be inserted. The taper pin 34 combines the travel screw member 13 and the press member 9 integrally. As a result, the urging force of the belleville spring 33 is constantly exerted on the travel screw member 13 through the press member 9 in such a direction that the travel screw member 13 advances. The belleville spring 33 is also a constituent of the brake driving device A.

Since the travel screw member 13 and the press member 9 are integrated by the taper pin 34, rotation of the travel screw member 13 around the center line is inhibited. As a result, when the nut member 14 rotates, the travel screw member 13 does not rotate together with the nut member 14. Namely, the rotation of the nut member 14 causes the travel screw member 13 to travel in a center line direction. The thread 13a and the thread 14a are designed such that, where the travel screw member 13 is seen from the rear side, the rotation of the nut member 14 to the left (counterclockwise rotation) causes the travel screw member 13 to advance, and the rotation of the nut member 14 to the right (clockwise rotation) causes the travel screw member 13 to retreat.

Figure 3:
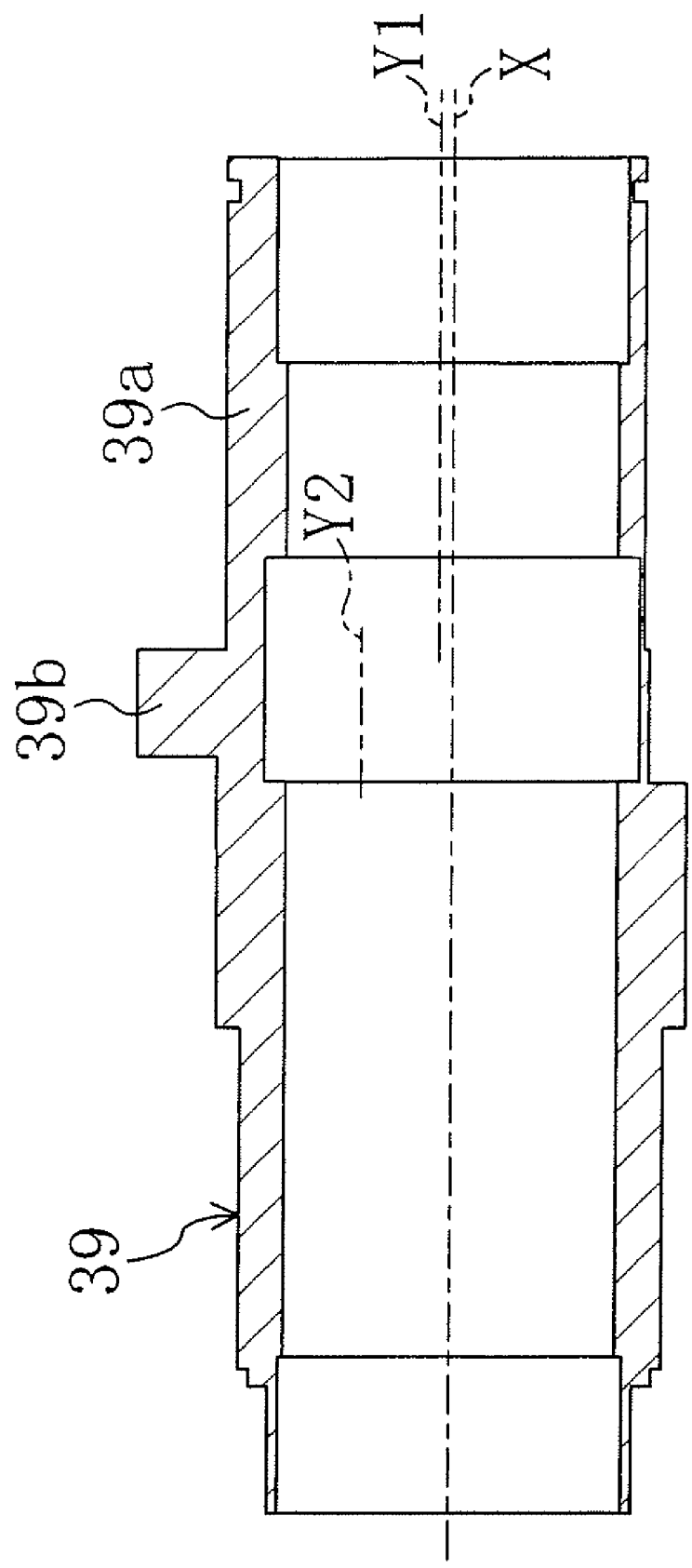
FIG. 3 is a cross-sectional view of an input shaft.

As shown in FIG. 2, an input shaft 39 is provided behind the extended part 14b of the nut member 14. Referring to FIG. 3, the input shaft 39 has a cylindrical shape, and the nut member 14 is inserted inside the input shaft 39. Center line X of the input shaft 39 is coincident with the center line of the nut member 14.

The input shaft 39 extends to the vicinity of the rear side of the nut member 14 and is rotatable relative to the nut member 14. The front side of the input shaft 39 has a front eccentric part 39a. Center line Y1 of the front eccentric part 39a extends in parallel with center line X and is eccentric from center line X of the input shaft 39 by a first predetermined amount. The input shaft 39 has a rear eccentric part 39b behind the front eccentric part 39a. Center line Y2 of the rear eccentric part 39b extends in parallel with center line X and is eccentric from center line X of the input shaft 39 in the same direction as the front eccentric part 39a by a second predetermined amount which is greater than the first predetermined amount. The first predetermined amount is 3.0 mm or less, and the second predetermined amount is 6.0 mm, which will be described later in detail. The front eccentric part 39a constitutes the first input-side eccentric part of the present invention, and the rear eccentric part 39b constitutes the second input-side eccentric part of the present invention.

The input shaft 39 is rotatably supported by the rear casing component 19 and the supporting plate 21 through input shaft bearings 42. The rotation center of the bearings 42 is on the center line of the nut member 14. Therefore, the input shaft 39 rotates relative to the nut member 14 around the same axis as the nut member 14.

Figure 4:
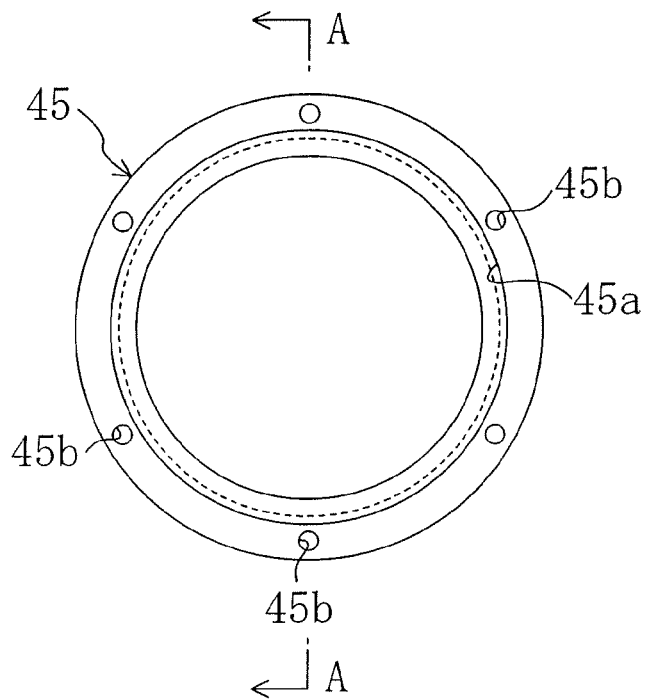
FIG. 4 is a front view of the internal gear.
Figure 5:
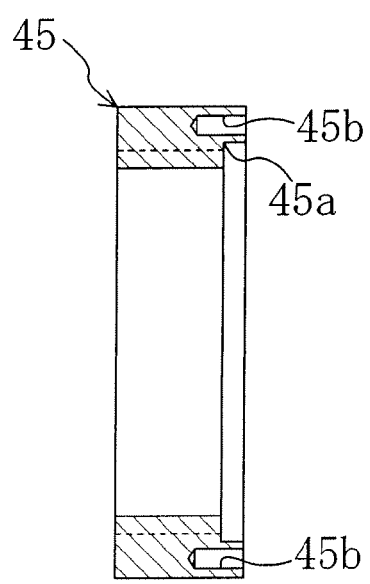
FIG. 5 is a cross-sectional view taken along line A-A of FIG. 4.

The internal gear 45 having an annular shape is attached to the rear side of the extended part 14b of the nut member 14. The number of teeth serially formed in the inner perimeter surface of the internal gear 45 is 44. The center line of the internal gear 45 is coincident with the center line of the nut member 14. The outside diameter of the internal gear 45 is about 90 mm which is generally equal to the outside diameter of the extended part 14b. The front surface of the internal gear 45 has a step 45a in which part of the extended part 14b inner than the bolt insertion holes 14c fits as shown in FIG. 4 and FIG. 5. The front surface of the internal gear 45 has a plurality of screw holes 45b corresponding to the bolt insertion holes 14c. The screw holes 45b of the internal gear 45 are aligned with the bolt insertion holes 14c of the extended part 14b, and the bolts 46 inserted through the bolt insertion holes 14c are screwed into the screw holes 45b such that the internal gear 45 is fixed to the extended part 14b. In this state, the internal gear 45 rotates integrally with the nut member 14 and coaxially with the nut member 14, i.e., around center line X of the input shaft 39.

Figure 6:
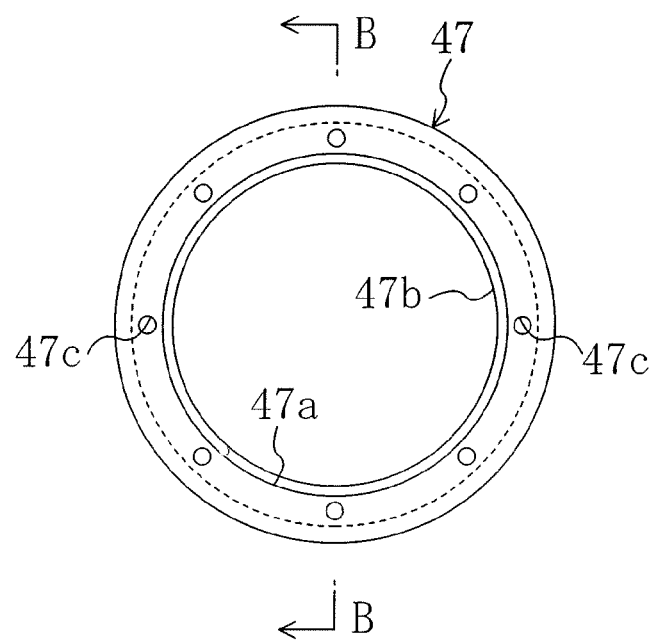
FIG. 6 is a rear view of an external gear.
Figure 7:
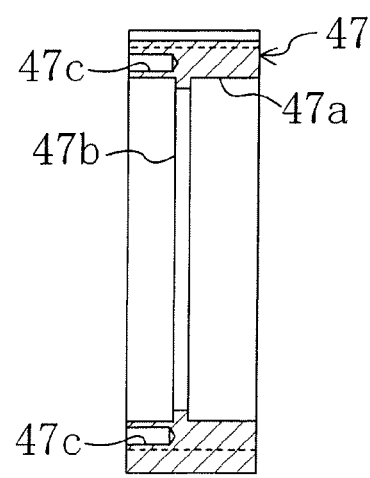
FIG. 7 is a cross-sectional view taken along line B-B of FIG. 6.

As shown in FIG. 2, an external gear 47 having a smaller diameter is provided inside the internal gear 45 so as to be meshed with the internal gear 45. As shown in FIG. 6 and FIG. 7, the central portion of the external gear 47 has a bearing receptor hole 47a in which external gear bearings 48 are fit. The bearing receptor hole 47a penetrates through the external gear 47 in the thickness direction. The rear surface of the external gear 47 has a plurality of screw holes 47c along the perimeter with intervals therebetween.

The external gear 47 is rotatably supported by the front eccentric part 39a of the input shaft 39 through the external gear bearings 48 as shown in FIG. 2. The number of teeth of the external gear 47 is 43. The tip diameter (addendum circle diameter) of the external gear 47 is smaller than the tip diameter of the internal gear 45 by a predetermined length. The first predetermined amount is set such that the teeth of the external gear 47 and the teeth of the internal gear 45 are partially meshed with each other (as shown in FIG. 2). Specifically, the first predetermined amount is set to about 1.5 mm. The first predetermined amount is to be changed according to the number of teeth, size, etc., of the internal gear 45 and the external gear 47. Referring to FIG. 2, reference numeral 50 denotes a stopper ring for stopping the external gear bearings 48. Reference numerals 51 and 52 denote collars for positioning of the external gear bearings 48.

Figure 8:
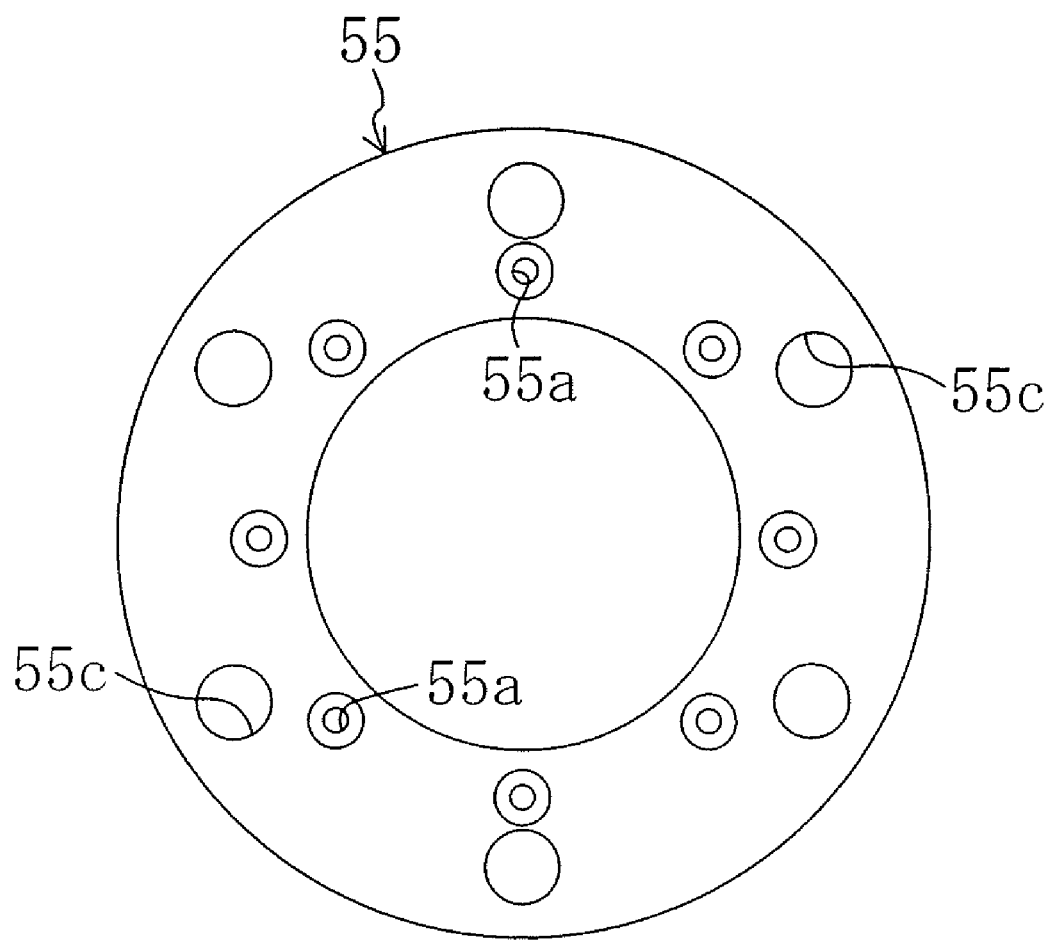
FIG. 8 is a rear view of an orbital motion plate.

As shown in FIG. 2, the rear side of the external gear 47 is provided with an orbital motion plate 55. The orbital motion plate 55 has the shape of a ring as shown in FIG. 8. The orbital motion plate 55 has a plurality of bolt insertion holes 55a along the inner perimeter. The bolt insertion holes 55a correspond to the screw holes 47c of the external gear 47 and penetrate through the orbital motion plate 55. The orbital motion plate 55 also has six through holes 55c along the outer perimeter with equal intervals. The orbital motion plate 55 is fixed to the external gear 47 with bolts 56.

Figure 9:
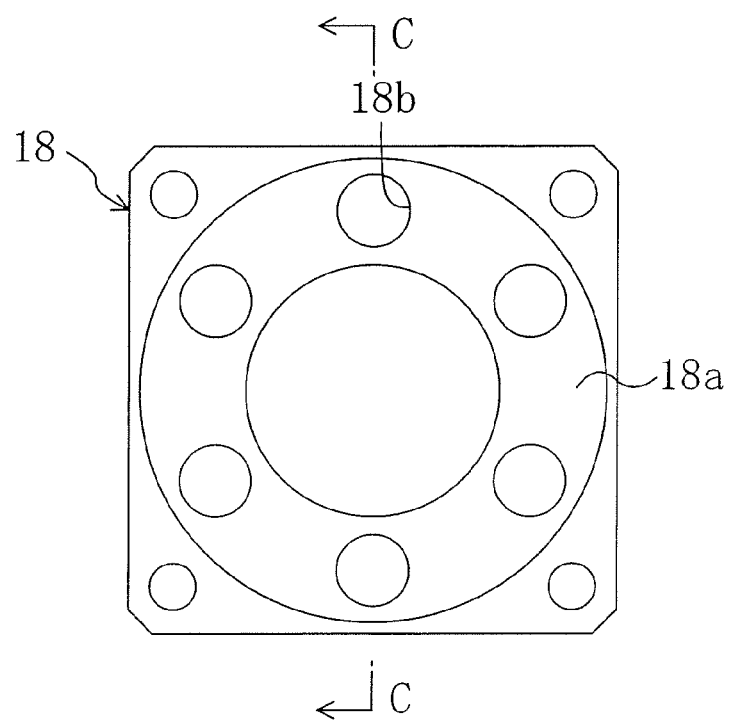
FIG. 9 is a front view of a front casing component.
Figure 10:
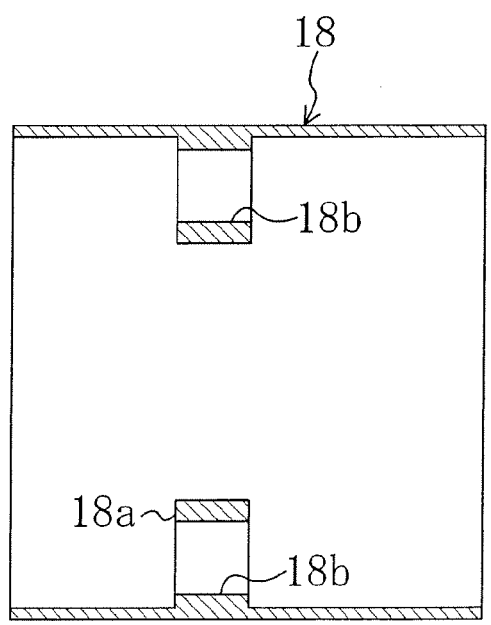
FIG. 10 is a cross-sectional view taken along line C-C of FIG. 9.

As shown in FIG. 9 and FIG. 10, the inner surface of the front casing component 18 has an inwardly-protruding annular supporting portion 18a which has the shape of a thick plate. The supporting portion 18a has, as shown in FIG. 2, six crank pin insertion holes 18b along the perimeter with equal intervals for supporting crank pins 60. The crank pins 60 are supported by the crank pin insertion holes 18b. Namely, the gear device 1 has six crank pins 60.

Figure 11:
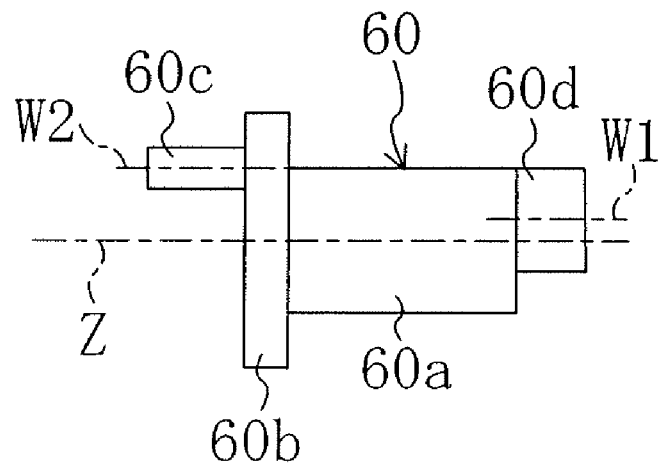
FIG. 11 is an enlarged view of a crank pin.
Figure 12:
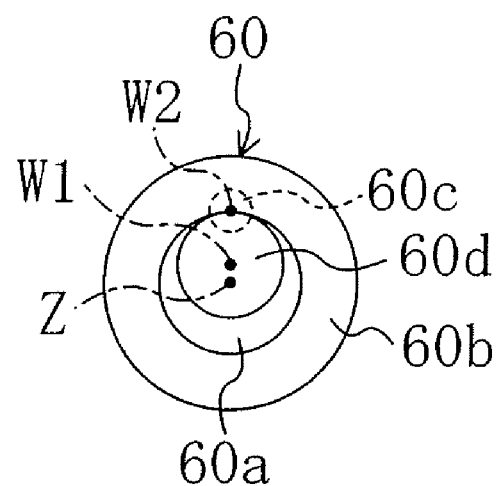
FIG. 12 is an enlarged front view of the crank pin.

As shown in FIG. 11 and FIG. 12, the crank pins 60 each include a large diameter part 60a which is to be inserted into the crank pin insertion hole 18b, an extended part 60b radially extending at the rear end of the large diameter part 60a, and a small diameter part 60c extending from the rear surface of the extended part 60b. As shown in FIG. 2, the large diameter part 60a is rotatably supported by the crank pin insertion hole 18b through a bush 65 while being inserted in the bush 65.

The front end of the large diameter part 60a has an engagement part 60d which is to be engaged with the orbital motion plate 55. The engagement part 60d has a protruding shape with a circular cross section whose diameter is smaller than that of the large diameter part 60a. Center line W1 of the engagement part 60d (shown only in FIG. 11 and FIG. 12) is deviated from center line Z of the large diameter part 60a by the same eccentricity as that of the front eccentric part 39a of the input shaft 39. As shown in FIG. 2, the engagement parts 60d are positioned so as to correspond to the through holes 55c of the orbital motion plate 55 and designed so as to be insertable to the through holes 55c. While the engagement parts 60d are inserted into the through holes 55c, the crank pins 60 are engaged with the orbital motion plate 55, i.e., the external gear 47, so that the rotation of the external gear 47 is prevented. The crank pins 60 constitute a crankshaft which controls the external gear 47 so as to produce eccentrically-orbital motion with respect to the internal gear 45.

The small diameter part 60c has a cylindrical shape whose center line W2 (shown only in FIG. 11 and FIG. 12) is deviated from center line Z of the large diameter part 60a by the same eccentricity as that of the rear eccentric part 39b of the input shaft 39. The engagement part 60d constitutes the first crank-side eccentric part of the present invention, and the small diameter part 60c constitutes the second crank-side eccentric part of the present invention.

Figure 13:
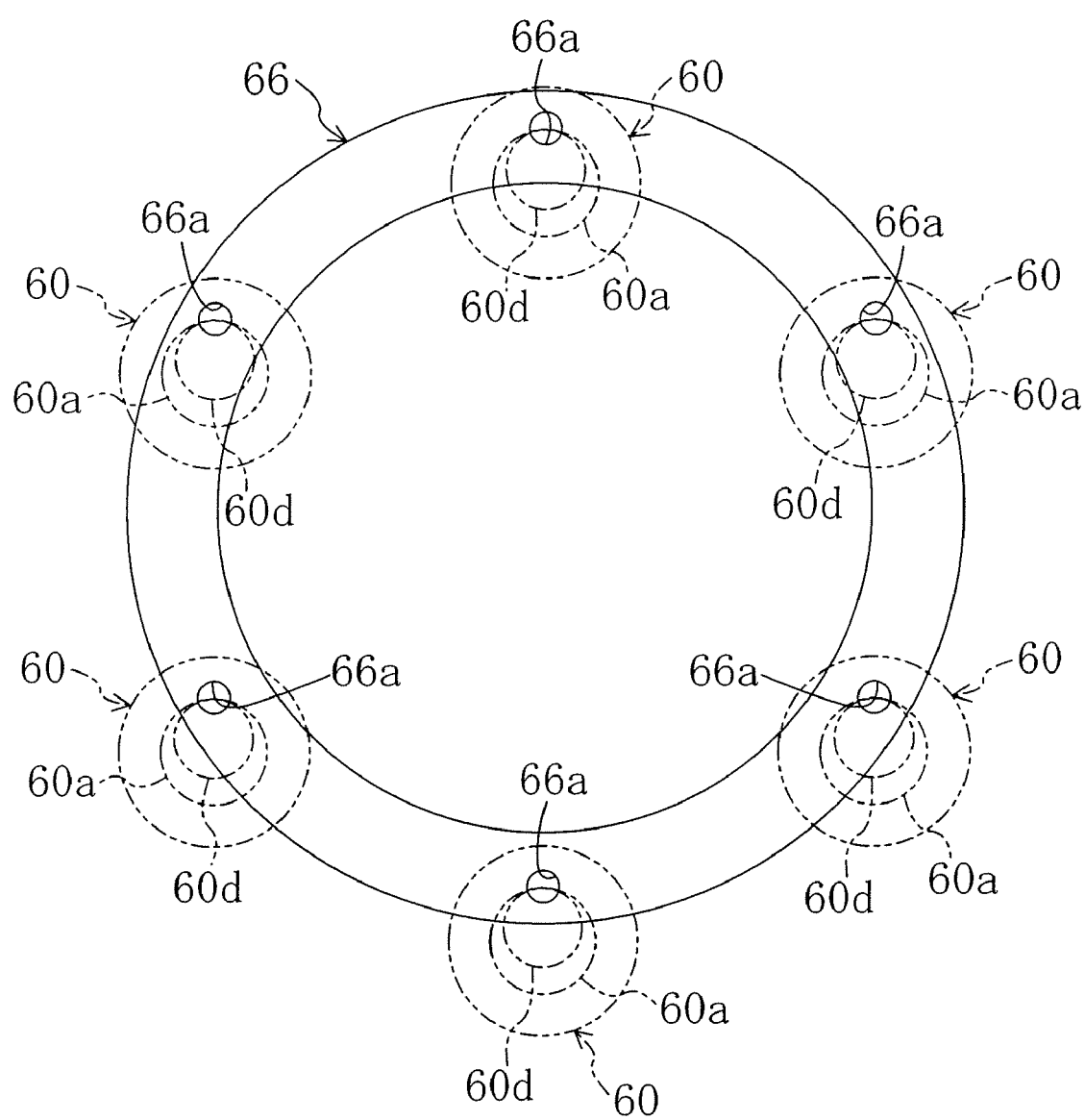
FIG. 13 is an enlarged front view of a linking member.

The six crank pins 60 are linked by a linking member 66 provided at the base end of the small diameter part 60c. As shown in FIG. 13, the linking member 66 is formed by an annular thin plate and has six insertion holes 60a along the perimeter with equal intervals, through which the small diameter parts 60c are to be inserted. The small diameter parts 60c are rotatable inside the insertion holes 60a while being inserted in the insertion holes 60a.

As shown in FIG. 2, a driving plate 67, which is a driving member for rotating the crank pins 60 around center line Z of the large diameter parts 60a, is supported by the rear eccentric part 39b of the input shaft 39 through a bearing 68. The driving plate 67 has the shape of a ring with a central hole, in which the bearing 68 is fittingly installed. This makes the driving plate 67 rotatable around center line Y2 of the rear eccentric part 39b. While the driving plate 67 is supported by the input shaft 39, the center of the driving plate 67 is more eccentric from center line X of the input shaft 39 than the external gear 47.

The driving plate 67 has small diameter part insertion holes 67a through which the small diameter parts 60c of the crank pins 60 are to be inserted. The small diameter parts 60c inserted in the small diameter part insertion holes 67a are supported by the driving plate 67 through a bush 63 so as to be rotatable around center line W2. By being inserted into the small diameter part insertion holes 67a, the small diameter part 60c is engaged with the driving plate 67.

The input shaft 39, the internal gear 45, the external gear 47, the front casing component 18, the orbital motion plate 55, the crank pins 60, the bearings 48 and 68, and the driving plate 67 constitute the gear device 1.

The electric motor 11 is a so-called frameless servo motor, which includes a rotor 11a and a stator 11b. The inner perimeter surface of the rotor 11a is adhered on the outer perimeter surface of the input shaft 39. The outer perimeter surface of the stator 11b is adhered on the inner perimeter surface of the rear casing component 19.

Although not shown, the electric motor 11 is controlled as to rotation direction (forward or reverse) or rotation angle by a known servo control device provided outside the casing 10.

The casing 10 is designed such that a rotary encoder (not shown) for detecting the amount of rotation of the input shaft 39 is attachable at the rear end. The rotary encoder is connected to the servo control device.

Next, the operation of the braking mechanism 2 and the brake driving device A, which are configured as described above, is described. First, in the case where the braking mechanism 2 in the brake state as shown in FIG. 1 is shifted to the detached state, the servo control device powers the electric motor 11 such that the rotor 11a rotates to the right (clockwise).

The torque of the electric motor 11 rotates the input shaft 39 and, accordingly, the rear eccentric part 39b moves so that the driving plate 67, with which the crank pins 60 is engaged, starts orbiting with a larger eccentricity than that of the external gear 47 while the rotation of the driving plate 67 is inhibited. Since the eccentricity of the driving plate 67 is larger than that of the external gear 47, the effects of backlashes caused in the crank pins 60, etc., within their tolerances are small relative to the motion of the driving plate 67. This eccentrically-orbital motion of the driving plate 67 exerts force on the small diameter part 60c of the crank pins 60, so that the crank pins 60 can normally rotate around center line Z. As a result, the motion of the external gear 47 can be accurately controlled by the crank pins 60.

Figure 14:
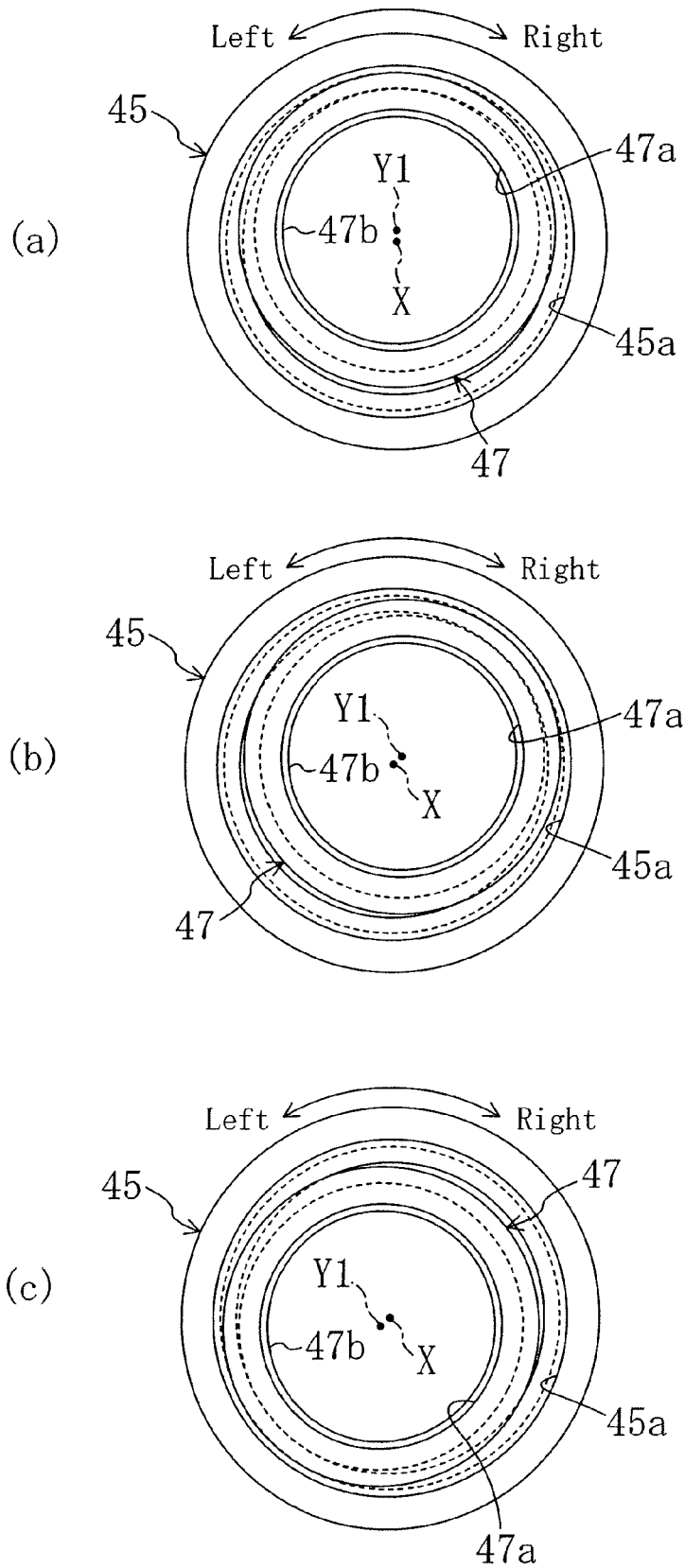
FIG. 14 illustrates eccentrically-orbital motion of the external gear.

Meanwhile, the motion of the front eccentric part 39a of the input shaft 39 causes the external gear 47 to start orbiting. Since in the meantime the normally-rotating crank pins 60 is engaged with the external gear 47, the motion of the external gear 47 is accurately controlled while the rotation of the external gear 47 is inhibited, so that the external gear 47 produces eccentrically-orbital motion around center line X while being meshed with the internal gear 45 as sequentially shown in parts (a) through (c) of FIG. 14. The number of teeth of the external gear 47 on the driver side is smaller than that of the internal gear 45 by one, so that one cycle of the orbital motion of the external gear 47 causes the internal gear 45 on the follower side to rotate to the right (clockwise) by an angle equivalent to one tooth. Namely, in this embodiment where the internal gear 45 has 44 teeth, 44 rotations of the external gear 47 cause the internal gear 45 to make one rotation, whereby the high reduction ratio of 1:44 is achieved. Thus, the torque of the electric motor 11 is increased, and the increased torque is transmitted to the nut member 14.

The rotation of the nut member 14 to the right (clockwise rotation) causes the travel screw member 13 to retreat against the urging force of the belleville spring 33 so that the brake pads 4a and 4b are detached from the brake disc 3, entering the detached state. It should be noted that the braking mechanism 2 can be returned to the brake state by rotating the electric motor 11 in the opposite direction.

As described hereinabove, according to the gear device 1 of this embodiment, the driving plate 67 which produces orbital motion with a large eccentricity than that of the external gear 47 causes the crank pins 60 to rotate. Thus, the motion of the external gear 47 can be accurately controlled such that smooth operation of the gear device 1 is realized without increasing the processing accuracy of respective parts and hence without narrowing the tolerances. Therefore, increase in price of the gear device 1 can be avoided.

Since the six crank pins 60 are provided, the motions of the six parts of the external gear 47 can be accurately controlled, such that the motion of the external gear 47 is smoothly produced.

The six crank pins 60 are linked by the linking member 66 to cooperate with each other and are rotated by a single piece of driving plate 67 in the same fashion. Thus, the motion of the external gear 47 can be controlled more accurately.

The number of teeth of the internal gear 45 and the external gear 47 can be arbitrarily set to numbers other than those specified above.

Although in the above-described embodiment the present invention is applied to the brake driving device A, the present invention can be employed in applications other than the brake driving device A, including, for example, transfer of a mold die of a press molding apparatus, and transfer of various objects which are supposed to be transferred.

Although in this embodiment the rotation speed of the electric motor 11 is changed by the gear device 1 before output, the present invention is not limited to this application. For example, the rotation speed of a hydraulic motor or pneumatic motor may be changed by the gear device 1.

The number of the crank pins 60 is not limited to six but may be one or may be seven or more.

INDUSTRIAL APPLICABILITY

As described above, a gear device according to the present invention is suitable to, for example, transmission of the torque of an electric motor to a screw advancing mechanism.

The invention claimed is:

1. An eccentrically-orbital gear device, comprising: an internal gear; an external gear placed inside the internal gear; an input shaft having a first input-side eccentric part which is inserted in a central hole formed in the external gear such that the first input-side eccentric part is rotatable around its center line; and a crankshaft rotatably supported by a device main body, the crankshaft having a first crank-side eccentric part which is engageable with the external gear with an eccentricity equal to that of the first input-side eccentric part, the external gear producing eccentrically-orbital motion while being meshed with the internal gear and being inhibited by the crankshaft from rotating, wherein
   the input shaft has a second input-side eccentric part whose eccentricity is larger than that of the first input-side eccentric part,
   the second input-side eccentric part is provided with a driving member for driving the crankshaft such that the driving member is rotatable around a center line of the second input-side eccentric part, and
   the crankshaft has a second crank-side eccentric part which has an eccentricity equal to that of the second input-side eccentric part and which is engageable with the driving member.

2. The gear device of claim 1, wherein the crankshaft includes a plurality of crankshafts.

3. The gear device of claim 2, wherein the plurality of crankshafts are driven by a single driving member.

4. The gear device of claim 2, further comprising a linking member for linking the plurality of crankshafts.

* * * * *